United States Patent
Li et al.

(10) Patent No.: US 12,047,961 B2
(45) Date of Patent: Jul. 23, 2024

(54) METHODS AND APPARATUSES FOR TRANSMITTING AND CONFIGURING SIDELINK DATA

(71) Applicant: FUJITSU LIMITED, Kawasaki (JP)

(72) Inventors: Guorong Li, Beijing (CN); Pengyu Ji, Beijing (CN); Jian Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 546 days.

(21) Appl. No.: 17/208,585

(22) Filed: Mar. 22, 2021

(65) Prior Publication Data

US 2021/0212104 A1  Jul. 8, 2021

Related U.S. Application Data

(63) Continuation of application No. PCT/CN2018/113088, filed on Oct. 31, 2018.

(51) Int. Cl.
*H04W 72/23* (2023.01)
*H04W 76/14* (2018.01)
*H04W 76/16* (2018.01)

(52) U.S. Cl.
CPC .......... *H04W 72/23* (2023.01); *H04W 76/14* (2018.02); *H04W 76/16* (2018.02)

(58) Field of Classification Search
CPC ..... H04W 72/23; H04W 76/14; H04W 76/16; H04W 72/121; H04L 1/1896; H04L 2001/0092; H04L 1/1822
See application file for complete search history.

(56) References Cited

U.S. PATENT DOCUMENTS

| 2014/0086152 A1 | 3/2014 | Bontu et al. |
| 2015/0049694 A1 | 2/2015 | Choi et al. |

(Continued)

FOREIGN PATENT DOCUMENTS

| CN | 107027180 A | 8/2017 |
| CN | 107295664 A | 10/2017 |

(Continued)

OTHER PUBLICATIONS

Extended European search report with the supplementary European search report and the European search opinion issued by the European Patent Office for corresponding European Patent Application No. 18938425.8-1215, mailed on Oct. 26, 2021.

(Continued)

*Primary Examiner* — Charles C Jiang
*Assistant Examiner* — Shawn D Miller
(74) *Attorney, Agent, or Firm* — Myers Wolin, LLC

(57) ABSTRACT

Methods and apparatuses for transmitting and configuring sidelink data. The method includes: receiving by a terminal equipment control information including a sidelink grant and transmitted by a network device, the control information further indicating at least one piece of destination information to which the sidelink grant is directed; determining at least one destination and/or logical channel according to the destination information; and transmitting sidelink data of the at least one destination and/or logical channel according to the sidelink grant. Thus, the network device is enabled to schedule different resources for different destination terminal equipments.

18 Claims, 7 Drawing Sheets

(56) References Cited

U.S. PATENT DOCUMENTS

| | | | |
|---|---|---|---|
| 2017/0094656 A1 | 3/2017 | Chen et al. | |
| 2017/0127405 A1* | 5/2017 | Agiwal | H04W 72/51 |
| 2018/0139724 A1* | 5/2018 | Loehr | H04W 72/02 |
| 2018/0234868 A1* | 8/2018 | Zhang | H04B 17/309 |
| 2018/0270839 A1* | 9/2018 | Loehr | H04W 72/0446 |
| 2019/0052416 A1* | 2/2019 | Babaei | H04W 76/28 |
| 2020/0037190 A1* | 1/2020 | Wu | H04W 28/0278 |

FOREIGN PATENT DOCUMENTS

| | | |
|---|---|---|
| CN | 108353422 A | 7/2018 |
| JP | 2017-163173 A | 9/2017 |
| WO | 2017/034231 A1 | 3/2017 |
| WO | 2017/069444 A1 | 4/2017 |
| WO | 2018/107458 A1 | 6/2018 |

OTHER PUBLICATIONS

3GPP TS 36.321 V14.8.0, "3rd Generation Partnership Project; Technical Specification Group Radio Access Network; Evolved Universal Terrestrial Radio Access (E-UTRA); Medium Access Control (MAC) protocol specification (Release 14)", Sep. 2018.
Ericsson, "On Latency of mode-1 Sidelink Scheduling", Agenda item: 11.4.2.4, 3GPP TSG-RAN WG2 Meeting #103-Bis, TDoc R2-1815033, Chengdu, China, Oct. 8-12, 2018.
Huawei et al., "Suport for sidelink unicast, groupcast and broadcast", Agenda item: 7.2.4.1.1, 3GPP TSG RAN WG1 Meeting #94bis, R1-1810137, Chengdu, China, Oct. 8-12, 2018.
Communication pursuant to Article 94(3) EPC issued by the European Patent Office for corresponding European Patent Application No. 18938425.8-1215, mailed on Jul. 5, 2023.
International Search Report and Written Opinion of the International Searching Authority issued by the State Intellectual Property Office of the P.R. China for corresponding International Patent Application No. PCT/CN2018/113088, mailed on Jul. 30, 2019, with an English translation.
Huawei et al., "Discussion on sidelink resource allocation and configuration", Agenda Item: 5.2.9.2.3.2, 3GPP TSG-RAN WG1 Meeting #90, R1-1712135, Prague, Czech Republic, Aug. 21-25, 2017.
Notice of Reasons for Refusal issued by the Japan Patent Office for corresponding Japanese Patent Application No. 2021-517678, mailed on Apr. 19, 2022, with an English translation.
Ericsson, "Other MAC Miscellaneous Impact", Agenda Item: 9.10.2.2, 3GPP TSG-RAN WG2 Meeting #101-Bis, Tdoc R2-1805737, Sanya, China, Apr. 16-20, 2018.
Huawei et al., "Discussion on how to deal with Destination L2 ID during Tx carrier selection", Agenda Item: 9.10.2, 3GPP TSG-RAN WG2 Meeting #100, R2-1712744, Reno, USA, Nov. 27-Dec. 1, 2017.
First Notification of Office Action and Search Report issued by the China National Intellectual Property Administration for corresponding Chinese Patent Application No. 201880097691.8, mailed on Sep. 6, 2023, with an English translation.

* cited by examiner

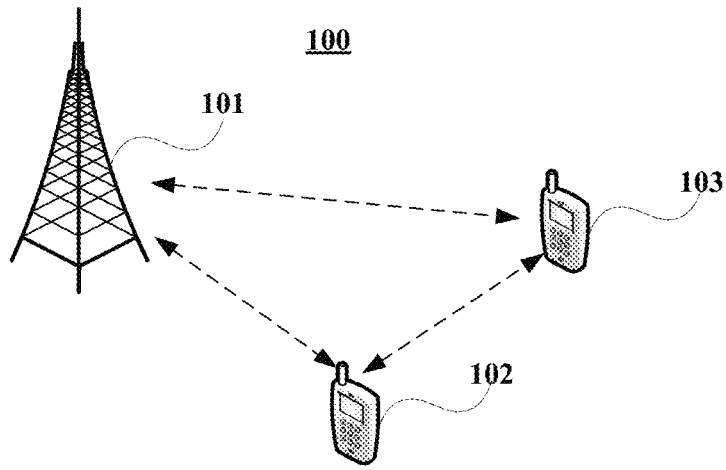

Fig. 1

201
a terminal equipment receives control information including a sidelink grant and transmitted by a network device, the control information further indicating at least one piece of destination information to which the sidelink grant is directed

202
the terminal equipment determines at least one destination and/or logical channel according to the destination information

203
the terminal equipment transmits sidelink data of the at least one destination and/or logical channel according to the sidelink grant

Fig. 2

METHODS AND APPARATUSES FOR TRANSMITTING AND CONFIGURING SIDELINK DATA

CROSS-REFERENCE TO RELATED APPLICATION

This application is a continuation application of International Application PCT/CN2018/113088 filed on Oct. 31, 2018 and designated the U.S., the entire contents of which are incorporated herein by reference.

TECHNICAL FIELD

This disclosure relates to the field of communication technologies, and in particular to methods and apparatuses for transmitting and configuring sidelink data.

BACKGROUND

Vehicle to Everything (V2X) of Long Term Evolution (LTE) is a vehicle communication technology that can realize vehicle-to-vehicle (V2V), vehicle-to-roadside equipment (V2I), and vehicle-to-pedestrian (V2P) information exchange.

V2X services may be provided via a PC5 interface and/or a Uu interface. The V2X services transmitted via the PC5 interface are provided by V2X sidelink (SL) communication, which is a communication mode in which terminal equipments may directly communicate with each other via the PC5 interface. In LTE, this communication mode is supported when the terminal equipments are served by E-UTRAN and when the terminal equipments are out of the coverage of E-UTRA.

In LTE V2X, the sidelink communication mainly considers the use of a broadcast mode to transmit sidelink data. For NR V2X, in order to support more advanced V2X application scenarios and services, unicast, groupcast and broadcast mode may be used to transmit sidelink data.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

For NR V2X, it was agreed in discussion of the 3GPP physical layer that a physical layer needs to know whether specific data are transmitted on a sidelink in a unicast, groupcast or broadcast mode. And for unicast or groupcast, the physical layer transmits a layer 1 destination (or may be referred to as a target) identification (destination ID) and another layer 1 ID (possibly a source ID) in control information on the sidelink. And for unicast or groupcast, the physical layer supports sidelink hybrid automatic repeat request (HARQ) feedback and HARQ merging operations, etc. It was agreed in RAN2 that a destination ID for a specific group for groupcast (which may be referred to as a destination terminal equipment group identifier) and a destination ID for a destination terminal equipment for unicast (which may be referred to as a destination terminal equipment identifier) need to be respectively visible in layer 2, and the source terminal equipment ID should also be visible to layer 2.

It was found by the inventors that, for example, for a mode scheduled by a network device (such as a base station) (mode-1), a sidelink grant (SL grant) transmitted by the network device to a transmitting terminal equipment in LTE may be used by the transmitting terminal equipment to transmit sidelink data to be transmitted to any other terminal equipment, and according to a priority of a logical channel having available data for transmission, a media access control (MAC) layer of the transmitting terminal equipment selects a destination address of sidelink transmission, and transmits logical channel data to which the destination address corresponds by using a sidelink resource indicated by the SL grant.

However, the terminal equipment may simultaneously have unicast services to more than one destination terminal equipments, or simultaneously have groupcast services to more than one destination terminal equipment groups, or simultaneously have both unicast and groupcast services, etc. Since an HARQ operation is supported for unicast or groupcast services on a sidelink, the transmitting terminal equipment needs to know whether the SL grant transmitted by the network device is used to transmit HARQ initial transmission data to a destination terminal equipment or is used to transmit HARQ retransmission data to a destination terminal equipment. Indicating information on destination terminal equipment by the network device to the transmitting terminal equipment cannot be achieved in the relevant art, hence, it is difficult for the transmitting terminal equipment performs sidelink transmission by using appropriate resources for feedback or status report of the destination terminal equipment, thereby possibly lowering channel utilization or transmission reliability, and being unable to meet requirements on quality of service (QoS) of V2X services.

Addressed to the above problems, embodiments of this disclosure provide methods and apparatuses for transmitting and configuring sidelink data.

According to a first aspect of the embodiments of this disclosure, there is provided a method for transmitting sidelink data, including:

receiving, by a terminal equipment, control information including a sidelink grant and transmitted by a network device, the control information further indicating at least one piece of destination information to which the sidelink grant is directed;

determining at least one destination and/or logical channel according to the destination information; and transmitting sidelink data of the at least one destination and/or logical channel according to the sidelink grant.

According to a second aspect of the embodiments of this disclosure, there is provided an apparatus for transmitting sidelink data, including:

a receiving unit configured to receive control information including a sidelink grant and transmitted by a network device, the control information further indicating at least one piece of destination information to which the sidelink grant is directed;

a destination determining unit configured to determine at least one destination and/or logical channel according to the destination information; and a transmitting unit configured to transmit sidelink data of the at least one destination and/or logical channel according to the sidelink grant.

According to a third aspect of the embodiments of this disclosure, there is provided a method for configuring sidelink data, including:

transmitting control information including a sidelink grant by a network device to a terminal equipment, the control information further indicating at least one piece of destination information to which the sidelink grant is directed.

According to a fourth aspect of the embodiments of this disclosure, there is provided an apparatus for configuring sidelink data, including:

a transmitting unit configured to transmit control information including a sidelink grant to a terminal equipment, the control information further indicating at least one piece of destination information to which the sidelink grant is directed.

According to a fifth aspect of the embodiments of this disclosure, there is provided a communication system, including:

a network device configured to transmit control information including a sidelink grant to a terminal equipment, the control information further indicating at least one piece of destination information to which the sidelink grant is directed;

a first terminal equipment configured to determine at least one destination and/or logical channel according to the destination information, and transmit sidelink data of the at least one destination and/or logical channel according to the sidelink grant; and a second terminal equipment configured to receive the sidelink data transmitted by the first terminal equipment.

An advantage of the embodiments of this disclosure exists in that by indicating, by the control information including the sidelink grant, the destination information to which the sidelink grant is directed, the network device is enabled to schedule HARQ initial transmission or transmission resources for different destination terminal equipments, and the transmitting terminal equipment is enabled to know the destination terminal equipment to which the sidelink grant corresponds and perform sidelink transmission by using suitable resources, thereby improving channel utilization or transmission reliability, and meeting requirements on quality of service (QoS) of V2X services.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 1 is schematic diagram of a communication system of an embodiment of this disclosure;

FIG. 2 is a schematic diagram of the method for transmitting sidelink data of an embodiment of this disclosure;

DETAILED DESCRIPTION

Figure 3:
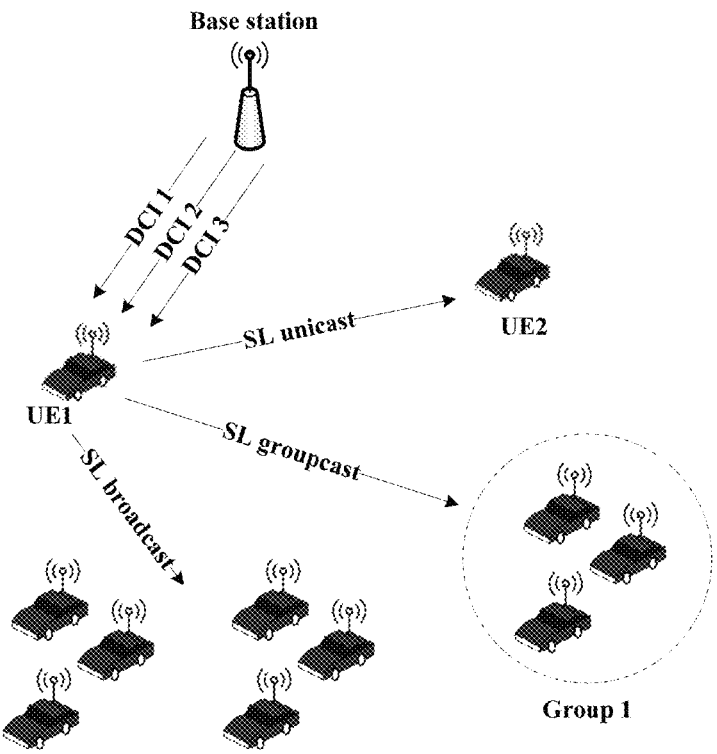
FIG. 3 is an exemplary diagram of a scenario of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network"

may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing traffics or traffics that may be implemented in the future may be performed between the network device 101 and the terminal equipments 102, 103. For example, such traffics may include but not limited to an enhanced mobile broadband (eMBB), massive machine type communication (MTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

The embodiments of this disclosure shall be described by taking a sidelink and V2X as examples; however, this disclosure is not limited thereto.

Embodiment 1

The embodiments of this disclosure provide a method for transmitting sidelink data, which shall be described from a transmitting device (also referred to as a first device). The transmitting device may be a terminal equipment; however, this disclosure is not limited thereto; for example, it may also be a roadside device or a network device.

FIG. 2 is a schematic diagram of the method for transmitting sidelink data of the embodiment of this disclosure. As shown in FIG. 2, the method includes:
  step 201: a terminal equipment receives control information including a sidelink grant and transmitted by a network device, the control information further indicating at least one piece of destination information to which the sidelink grant is directed;
  step 202: the terminal equipment determines at least one destination and/or logical channel according to the destination information; and
  step 203: the terminal equipment transmits sidelink data of the at least one destination and/or logical channel according to the sidelink grant.

In an embodiment, the destination information includes at least one of the following: a destination terminal equipment identifier, a destination terminal equipment group identifier, a link identifier or a connection identifier, a hybrid automatic repeat request (HARQ) entity identifier, a hybrid automatic repeat request (HARQ) process identifier, a source terminal equipment identifier and a destination terminal equipment (group) identifier, an identifier calculated according to the destination terminal equipment (group) identifier, an identifier calculated according to the source terminal equipment identifier and the destination terminal equipment (group) identifier; however, this disclosure is not limited thereto, and it may also be other information indicating a destination.

For example, when the destination information includes the destination terminal equipment identifier, the destination information may include a destination ID of a destination terminal equipment provided by a V2X application layer, or a destination address or identifier of a destination terminal equipment configured by a core network, or a destination address or identifier of a destination terminal equipment configured by a base station, such as a radio network temporary identifier (RNTI); however, it is not limited thereto.

Or, the destination terminal equipment identifier is a part of a provided destination ID or configured destination address or identifier, for example, the destination terminal equipment identifier is the highest or lowest of Y bits corresponding to a provided destination ID or configured destination address or identifier or X bits therein, X and Y being positive integers.

For another example, when the destination information includes the destination terminal equipment group identifier, the destination terminal equipment group identifier may a destination group ID of a destination terminal equipment group provided by a V2X application layer, or a destination group address or identifier of a destination terminal equipment group configured by a core network, or a destination group address or identifier of a destination terminal equipment group configured by a base station, such as a group radio network temporary identifier (group RNTI); however, it is not limited thereto.

Or, the destination terminal equipment group identifier is a part of a provided destination ID or configured destination group address or identifier, for example, the destination terminal equipment group identifier is the highest or lowest of Y bits corresponding to a provided destination ID or configured destination group address or identifier or X bits therein, X and Y being positive integers.

For a further example, when the destination information includes a link identifier or a connection identifier, the destination information may include a link identifier or a connection identifier of a sidelink of a transmitting terminal equipment for a destination terminal equipment and/or for a destination terminal equipment group and/or for broadcast. In order that the transmitting terminal equipment may determine sidelink transmission of a destination terminal equipment or destination terminal equipments to which a link identifier or a connection identifier indicated in the control information corresponds, the transmitting terminal equipment may know in advance a correspondence between the link identifier or connection identifier and the sidelink transmission.

The correspondence may be provided by the V2X application layer, or allocated by the core network, or allocated by the base station, or pre-configured, or predefined. When the correspondence is provided by the V2X application layer of the terminal equipment, or the correspondence is pre-configured or predefined, the terminal equipment transmits the correspondence to the base station via, for example, an RRC message, such as a SidelinkUEInformation message or a UEAssistantInformation message. When the correspondence is allocated to the terminal equipment by the core network, the core network or the terminal equipment transmits the correspondence to the base station. In addition, the terminal equipment may transmit a link identifier or connection identifier to which a logical channel group belongs to the base station in a sidelink buffer status report (SL BSR).

For yet another example, when the destination information includes a hybrid automatic repeat request (HARQ) entity identifier and/or an HARQ process identifier, the destination information may include an HARQ entity identifier and/or an HARQ process identifier in the transmitting terminal equipment. For a case where the HARQ entity identifier is included, the transmitting terminal equipment may know in advance a correspondence between the HARQ entity and the HARQ entity identifier, the correspondence being configured by the base station to the terminal equipment via, for example, an RRC reconfiguration message.

For still another example, when the destination information includes the source terminal equipment identifier and the destination terminal equipment (group) identifier, the source terminal equipment identifier and the destination terminal equipment (group) identifier included in the destination information may be a source ID and destination (group) ID provided by the X2X application layer, or a source terminal equipment address or identifier and a destination terminal equipment (group) address or identifier configured by the core network, or a source terminal equipment address or identifier and a destination terminal equipment (group) address or identifier.

Or, the destination information includes provided source ID+Destination (group) ID or the highest or lowest in Y bits to which configured source terminal equipment address or identifier+destination terminal equipment (group) address or identifier corresponds or X bits therein, X and Y being positive integers.

For yet still another example, when the destination information includes an identifier calculated according to the destination terminal equipment (group) identifier, the identifier may be calculated by using a specific function (such as a hash function) according to the C-RNTI or destination ID of the destination terminal equipment; and/or, when the destination information includes the identifier calculated according to the source terminal equipment identifier and the destination terminal equipment (group) identifier, it can be calculated by using the specific function (such as a hash function) according to an SL-RNTI or a C-RNTI or a source ID of the source terminal equipment and a C-RNTI or a destination ID of the destination terminal equipment (group).

In addition, the transmitting terminal equipment may know in advance a correspondence between the destination terminal equipment (group) identifier and the calculated identifier, or a correspondence between the source terminal equipment identifier, the destination terminal equipment (group) identifier and the calculated identifier. The correspondences may be configured by the base station to the terminal equipment (via for example, an RRC reconfiguration message), or may be provided by the V2X application layer, or may be configured by the core network to the terminal.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

FIG. 3 is an exemplary diagram of a scenario of an embodiment of this disclosure, in which transmission of sidelink data in a case where a mode of base station scheduling (mode-1) is exemplified. As shown in FIG. 3, a base station (a gNB or eNB) transmits downlink control information (DCI) to a transmitting device (such as UE 1). For example, as shown in FIG. 3, the DCI includes DCI 1, DCI 2 and DCI 3, each DCI including a sidelink grant (SL grant). And UE 1 performs transmission of V2X or D2D data on the sidelink by using resources and/or parameters indicated by the received SL grant.

As shown in FIG. 3, sidelink transmission is performed between UE 1 and UE 2 in a unicast mode. For example, the base station determines that the sidelink grant to which the sidelink transmission corresponds is included in DCI 1, and the DCI 1 transmitted by the base station further indicates destination information (such as UE 2 identifier) to which the sidelink grant is directed. And sidelink transmission is performed between UE 1 and group 1 in a groupcast mode. For example, the base station determines that the sidelink grant to which the sidelink transmission corresponds is included in DCI 2, and the DCI 2 transmitted by the base station further indicates destination information (such as group 1 identifier) to which the sidelink grant is directed.

In an embodiment, the destination information may be included in the control information. For example, the DCI contains a field to indicate the destination information, such as a destination ID field, and its size may be 8 bits, 16 bits, and 24 bits, etc.

In another embodiment, the destination information may be indicated by a resource where the control information is located. For example, there exists a mapping relationship between the physical resource where the DCI is located and the destination information, the mapping relationship being configurable. For example, there exists a mapping relationship between a time starting position or a frequency starting position of a search space where DCI is located and the destination information, and/or there exists a mapping relationship between a time starting position or a frequency starting position of a control resource set (CORESET) where DCI is located and the destination information.

In a further embodiment, the destination information may be indicated by scrambling cyclic redundancy check (CRC) of the control information by using the destination information. For example, the CRC of the DCI is scrambled by the destination information, that is, the DCI may address the destination information (such as an RNTI).

In an embodiment, if the destination information is not included in the physical layer signaling, it may indicate that the sidelink grant transmits the sidelink data in a broadcast mode.

In the embodiment of this disclosure, after the terminal equipment receives the sidelink grant, the MAC entity of the terminal equipment needs to perform destination address selection or logical channel selection in a process of determining at least one destination and/or logical channel (such as a logical channel prioritization (LCP) process of the sidelink); and at least one logical channel (LCH) may be selected from logical channels having available data for transmission, and the resources indicated by the sidelink grant may be allocated for the selected at least one logical channel in a descending order of priorities of the logical channels.

In an embodiment, the destination information may be layer 2 information or information on a layer higher than layer 2 (i.e. higher layer information). Layer 1 (L1), for example, includes a physical layer, layer 2 (L2), for example, includes an MAC layer, a radio link control (RLC) layer, etc., and layer higher than layer 2 (a higher layer) may include a radio resource control (RRC) layer, a V2X application layer, a layer above the access layer, etc., and reference may be made to related technologies for specific definitions of the layers.

Figure 4:
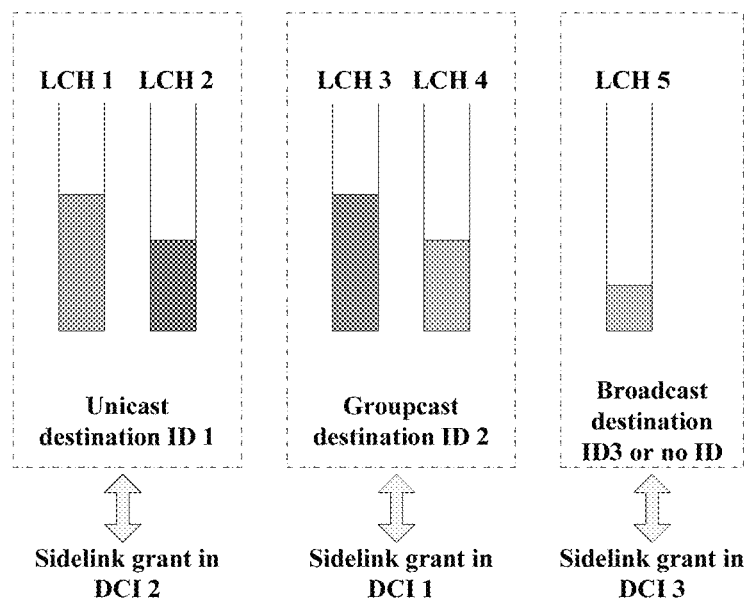
FIG. 4 is an exemplary diagram of a process of determining at least one destination and/or a logical channel of an embodiment of this disclosure.

FIG. 4 is an exemplary diagram of a process of determining at least one destination and/or a logical channel (such as an LCP process) of the embodiment of this disclosure, the sidelink grant includes a destination ID or group ID of layer 2 or the higher layer. As shown in FIG. 4, assuming that DCI 1 including the sidelink grant indicates a groupcast destination ID 2, the transmitting terminal equipment transmits data for the groupcast destination ID 2 by using the resources indicated by the sidelink grant in DCI 1; and assuming that DCI 2 including the sidelink grant indicates a unicast destination ID 1, the transmitting terminal equipment transmits data for the unicast destination ID 1 by using the resources indicated by the sidelink grant in DCI 2, and so on.

In an embodiment, a destination address and its logical channel related to the destination information indicated by the sidelink grant may be selected. The determining at least one destination and/or logical channel according to the destination information includes: selecting at least one destination having an identifier in consistence with that of the destination information (for example, there IDs are identical), and determining logical channel(s) to which the selected at least one destination corresponds.

For example, for modification of the MAC specification, taking the destination ID as an example, the selection of the destination address may be as follows:
   Step 0: Select one or more Destinations, having the same destination IDs as indicated by SL grant
   . . .

In another embodiment, a logical channel related to the destination information indicated by the sidelink grant may be selected. And the determining at least one destination and/or logical channel according to the destination information includes: selecting at least one logical channel corresponding to a destination identifier in consistence with that of the destination information.

For example, for modification of the MAC specification, taking the destination ID as an example, the selection of the destination address may be as follows:
   1>select the logical channels for each SL grant that satisfy all the following conditions:
     2>the destination ID, if configured, is the same as the destination ID indicated by the SL grant; and
   . . .

In an embodiment, the destination information is Layer 1 information, and the terminal equipment may map the Layer 1 information into at least one piece of Layer 2 information or information on a layer higher than the Layer 2 (higher layer information). And the terminal equipment may receive a mapping relationship between the Layer 1 information and the Layer 2 information or information on a layer higher than the Layer 2 transmitted by the network device. Or, the mapping relationship may be predefined, for example, the mapping relationship is L1 ID being high X bits or low X bits (X being a positive integer) of L2 destination ID or higher layer destination ID, etc.

Figure 5:
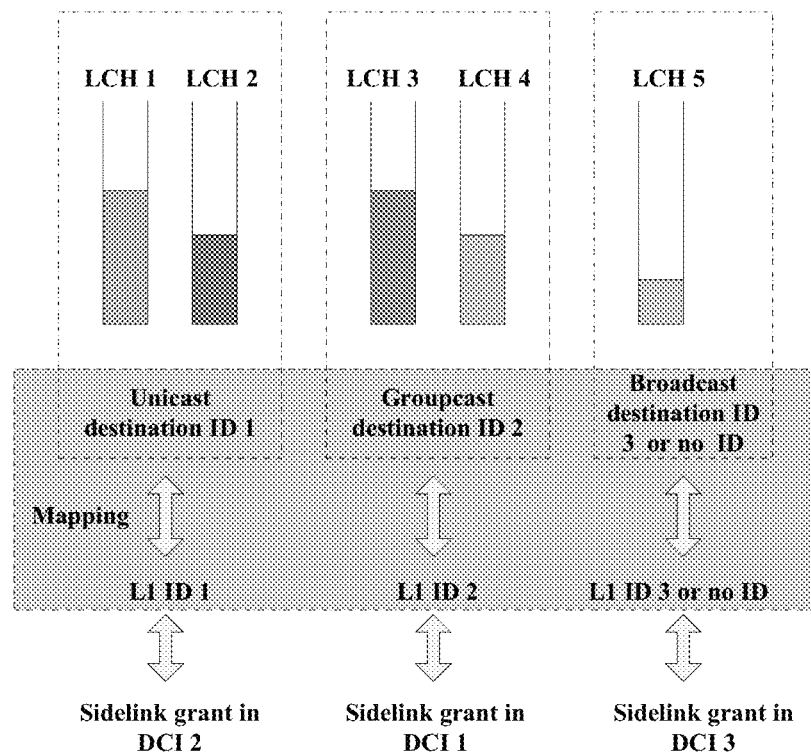
FIG. 5 is another exemplary diagram of the process of determining at least one destination and/or a logical channel of the embodiment of this disclosure.

FIG. 5 is another exemplary diagram of the process of determining at least one destination and/or a logical channel (such as an LCP process) of the embodiment of this disclosure, in which the sidelink grant includes the destination ID or group ID of Layer 1. As shown in FIG. 5, assuming that DCI 1 including the sidelink grant indicates a groupcast destination ID 2, the terminal equipment maps it and transmits data for the groupcast destination ID 2 by using the resources indicated by the sidelink grant in DCI 1. And assuming that DCI 2 including the sidelink grant indicates a unicast destination ID 1, the terminal equipment maps it and transmits data for the unicast destination ID 1 by using the resources indicated by the sidelink grant in DCI 2, and so on.

Figure 6:
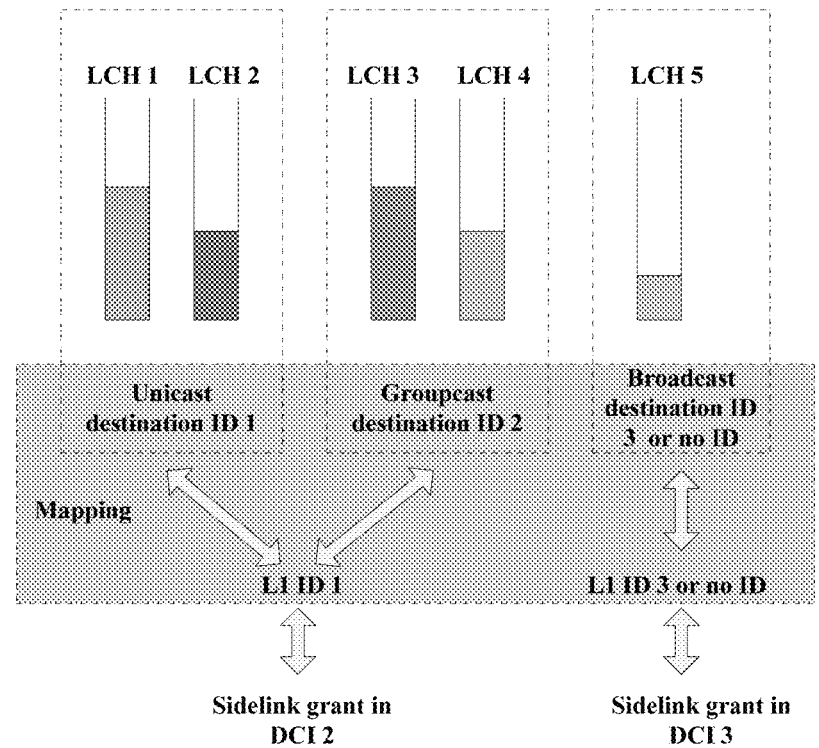
FIG. 6 is a further exemplary diagram of the process of determining at least one destination and/or a logical channel of the embodiment of this disclosure.

FIG. 6 is a further exemplary diagram of the process of determining at least one destination and/or a logical channel (such as an LCP process) of the embodiment of this disclosure, in which the sidelink grant includes the destination ID or group ID of Layer 1. As shown in FIG. 6, Layer 1 ID 1 included in DCI 2 may be mapped onto two layer 2 IDs (the unicast destination ID 1 and groupcast destination ID 2).

For example, for modification of the MAC specification, taking the destination ID as an example, the selection of the destination address may be as follows:

Step 0: Select the Destination(s), having the destination IDs mapped to the L1 destination ID as indicated by SL grant;
. . .

For example, for modification of the MAC specification, taking the destination ID as an example, the selection of the logical channel may be as follows:

1>select the logical channels for each SL grant that satisfy all the following conditions:
2>the destination ID(s), if configured, is mapped to the L1 destination ID indicated by the SL grant; and
. . .

In an embodiment, the destination information may be a link identifier or a connection identifier, and the terminal equipment may select at least one destination and/or logical channel according to the link identifier or connection identifier. For example, a link or destination address and a logical channel related to (or corresponding to) the link identifier or connection identifier indicated by the control information may be selected; and for another example, at least one destination with an identifier in consistence with the destination information (such as identical IDs) is selected, and a logical channel to which the selected at least one destination corresponds is determined. Or, the terminal equipment may select a logical channel related to the destination information indicated by the control information. For example, at least one logical channel with a corresponding link identifier in consistence with the destination information (such as identical IDs) is selected.

In an embodiment, the destination information is a hybrid automatic repeat request (HARQ) entity identifier, and an HARQ entity identifier may be an HARQ entity ID. The terminal equipment may transmit initial or retransmission data of an HARQ process of an HARQ entity with an identifier in accordance with the HARQ entity ID in the resource indicated by the sidelink grant, according to the HARQ entity ID. For example, if the control information indicates HARQ retransmission, the MAC layer retransmits a last transmitted MAC PDU of the HARQ process of the HARQ entity, and no more logical channel selection needs to be performed.

In an embodiment, the destination information is a hybrid automatic repeat request (HARQ) process ID, and an HARQ process identifier may be an HARQ process ID. The terminal equipment may transmit initial or retransmission data of an HARQ process with an identifier in accordance with the HARQ process ID (such as identical IDs) in the resource indicated by the sidelink grant, according to the HARQ process ID.

In an embodiment, the destination information is a hybrid automatic repeat request (HARQ) entity ID and process ID, an HARQ entity identifier may be an HARQ entity ID, and an HARQ process identifier may be an HARQ process ID. The terminal equipment may transmit initial or retransmission data of an HARQ process of an HARQ entity with an identifier in accordance with the HARQ entity ID and HARQ process ID (such as identical IDs) in the resource indicated by the sidelink grant, according to the HARQ entity ID and the HARQ process ID.

In an embodiment, the destination information is a source terminal equipment identification and a destination terminal equipment (group) identification. Or, the destination information is an identifier calculated according to the destination terminal equipment (group) identifier, or an identifier calculated according to the source terminal equipment identifier and the destination terminal equipment (group) identifier; and the terminal equipment may map the calculated identifier into at least one destination terminal equipment (group) ID, or a source terminal equipment ID and destination terminal equipment (group) ID.

In an embodiment, a destination address related to the destination information indicated by the control information and its logical channel may be selected. And the determining at least one destination and/or logical channel according to the destination information includes: selecting at least one destination with an identifier in consistence with the destination information (such as identical IDs); and determining at least one logical channel to which the selected at least one destination corresponds.

In another embodiment, a logical channel related to the destination information indicated by the control information may be selected. And the determining at least one destination and/or logical channel according to the destination information includes: selecting at least one logical channel with a corresponding destination identifier in consistence with the destination information (such as identical IDs).

The above control information and destination information of the embodiment of this disclosure are schematically illustrated; however, this disclosure is not limited thereto. An exchange process of the network device (for example, the base station), a first terminal equipment (a transmitter of the sidelink data) and the second terminal equipment (a receiver of the sidelink data) shall be schematically described below.

Figure 7:
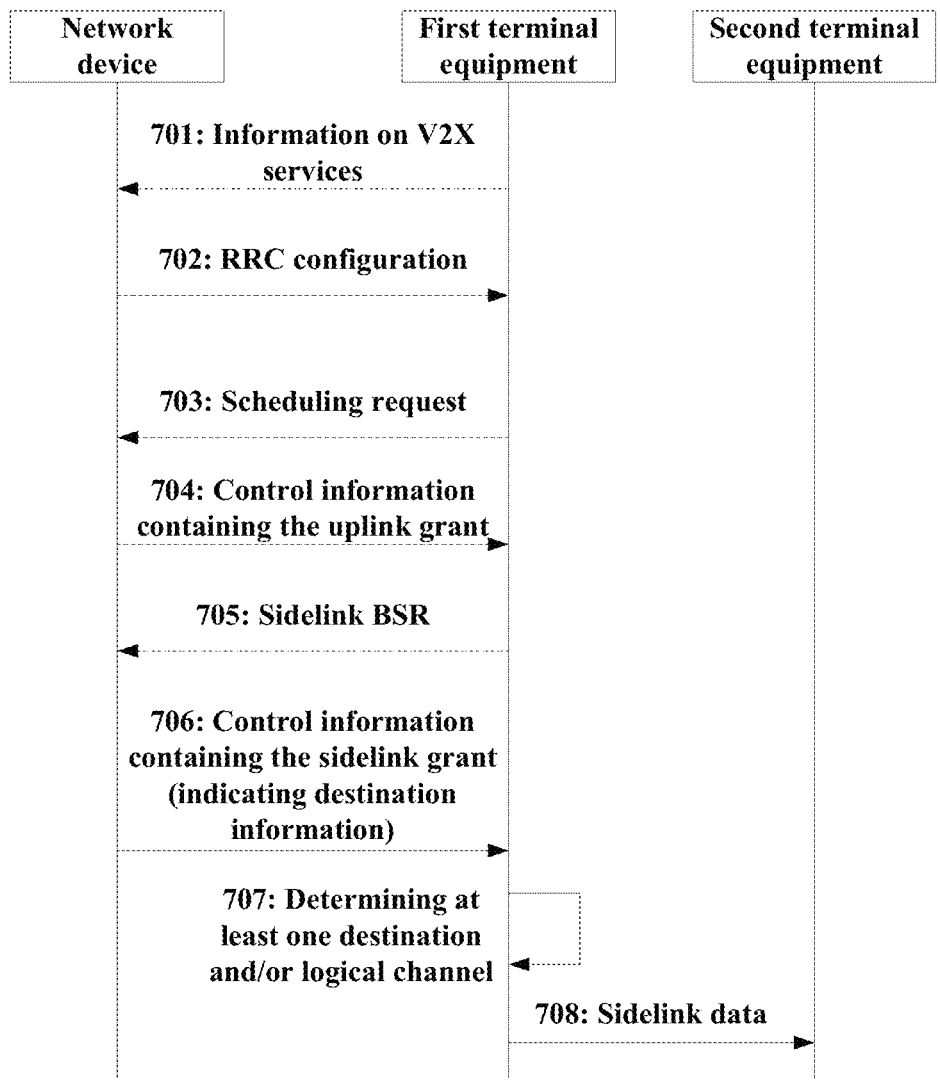
FIG. 7 is a schematic diagram of configuration, transmission and reception of an embodiment of this disclosure.

FIG. 7 is a schematic diagram of configuration, transmission and reception of the embodiment of this disclosure. As shown in FIG. 7, the process may include:

step 701: providing information on a V2X service;

for example, the first terminal equipment may provide the base station with at least one piece of the following information in an RRC message (such as SidelinkUEInformation or UEAssistantInformation): a QoS characteristic, a service type, a destination address and a frequency, a correspondence between a link identifier or connection identifier and sidelink transmission, a correspondence between the destination terminal equipment identifier and the calculated identifier, a correspondence between the source terminal equipment identifier and the destination terminal equipment identifier and the calculated identifier, etc., of a V2X service of interest.

Step 702: performing RRC configuration;

for example, the base station configures sidelink-related information via an RRC messages (such as an RRC Reconfiguration message), such as at least one piece of the following information: a logical channel, a logical channel group, a QoS parameter, a radio bearer, a resource pool, a destination address or identifier of a sidelink destination terminal equipment group, a correspondence between a link identifier or connection identifier and sidelink transmission, a correspondence between an HARQ entity and an HARQ entity identifier, an address or identifier of a source terminal equipment and an address or identifier of a destination terminal equipment (group), a correspondence between a source terminal equipment (group) identifier and the calculated identifier, etc.

As shown in FIG. 7, the process may further include:

step 703: transmitting a scheduling request by the first terminal equipment to the network device when the first terminal equipment needs to transmit sidelink data;

for example, when the transmitting terminal equipment has a V2X service to be transmitted, the terminal equipment may transmit the scheduling request (SR) to the base station. In order for the base station to allocate appropriate sidelink resources, the SR may correspond to at least one (such as specific) sidelink logical channel. For example, a correspondence between SR configuration and the sidelink logical channel is pre-configured by the base station, or is pre-defined.

Step 704: transmitting control information including an uplink grant by the network device;

for example, the base station transmits a physical downlink control channel (PDCCH) carrying DCI containing a UL grant.

Step 705: transmitting a sidelink buffer status report by the first terminal equipment to the network device according to the uplink grant to request the sidelink grant;

for example, the terminal equipment transmits the SL BSR (buffer status report) on an uplink resource indicated by the UL grant, the BSR carries such information as a destination identifier, an LCG ID (logical channel group identifier), and a buffer size, etc. The destination identifier includes, for example, at least one of the following: a destination address to which data are to be transmitted, a link identifier, a connection identifier, an HARQ entity identifier, an HARQ process identifier, an identifier calculated according to the destination terminal equipment (group) identifier, an identifier calculated according to the source terminal equipment and the destination terminal equipment (group) ID.

Step 706: transmitting the control information including the sidelink grant by the network device to the first terminal equipment, the control information further indicating destination information to which the sidelink grant is directed;

For example, after the base station receives the SL BSR transmitted by the terminal equipment (UE 1), it knows that the terminal equipment may have unicast data for another terminal equipment (UE 2), groupcast data for another group (group 1), and broadcast data for a neighboring terminal equipment at the same time.

The base station transmits the PDCCH to the terminal equipment (UE 1), the PDCCH carrying the DCI containing the SL grant. The base station may respectively transmit an SL grant for each destination identifier (such as a destination ID or a link ID, etc.) that UE 1 has data to transmit, or it may transmit an SL grant for more than one destination identifiers (such as destination IDs or link IDs, etc.).

Step 707: determining at least one destination and/or logical channel by the first terminal equipment according to the destination information.

Reference may be made to the above contents for the LCP process and HARQ operation. And the terminal equipment may assemble an MAC PDU according to the resource indicated by the SL grant and the identification information.

Step 708: transmitting sidelink data of the at least one destination and/or logical channel by the first terminal equipment according to the sidelink grant;

for example, the first terminal equipment transmits the MAC PDU to the second terminal equipment on the resource indicated by the sidelink grant.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

In an embodiment, the sidelink grant may also be associated with (or correspond to) at least one of the following: a subcarrier spacing, a physical sidelink shared channel (PSSCH) transmission duration, carrier information.

In an embodiment, the subcarrier spacing configured for the logical channel may include a subcarrier spacing with which the sidelink grant is associated, and/or, the PSSCH transmission duration configured for the logical channel may be greater than or equal to a PSSCH transmission duration with which the sidelink grant is associated, and/or, an allowed carrier configured for the logical channel may include the carrier information with which the sidelink grant is associated.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that by indicating, by the control information including the sidelink grant, the destination information to which the sidelink grant is directed, the network device is enabled to schedule different resources for different destination terminal equipments, and the transmitting terminal equipment is enabled to know the destination terminal equipment to which the sidelink grant corresponds and perform sidelink transmission by using suitable resources, thereby improving channel utilization or transmission reliability, and meeting requirements on quality of service (QoS) of V2X services.

In addition, the network device and the transmitting terminal device may make an agreement on a correspondence between the resource indicated by the side link grant and the destination terminal equipment, and the destination ID may no longer be carried in an MAC PDU subheader of the sidelink data, or, a length of the destination ID may be reduced, thereby lowering overhead of the MAC PDU and simplifying processing of the MAC PDU by the receiving terminal equipment.

Embodiment 2

The embodiments of this disclosure provide a method for configuring sidelink data, which shall be described from a network device side, with contents identical to those in Embodiment 1 being not going to be described herein any further.

Figure 8:
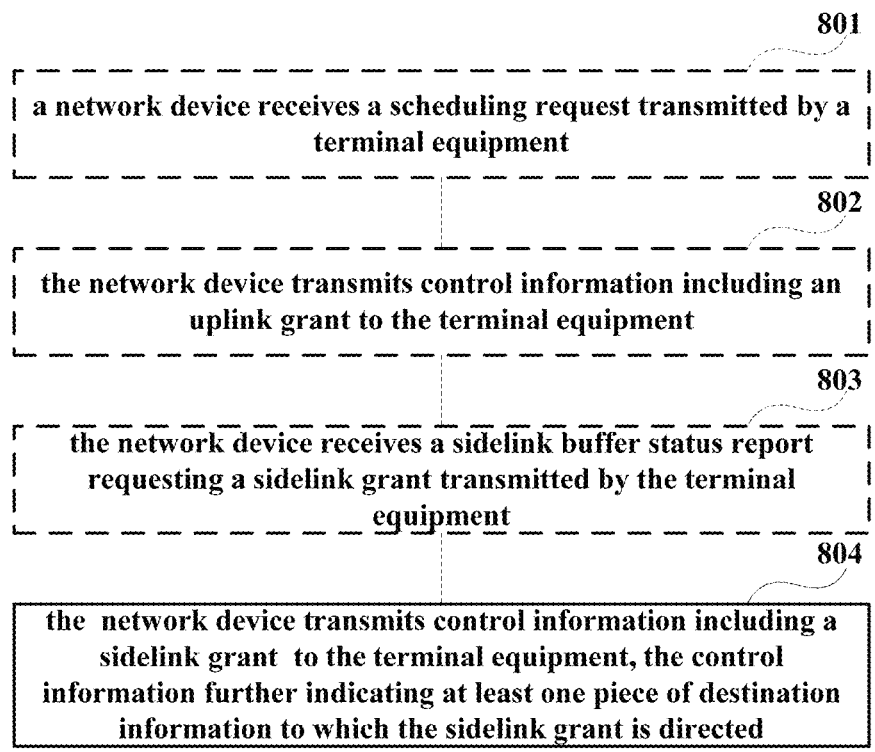
FIG. 8 is a schematic diagram of the method for configuring sidelink data of an embodiment of this disclosure.

FIG. 8 is a schematic diagram of the method for configuring sidelink data of the embodiment of this disclosure, showing a case at the network device side. As shown in FIG. 8, the method includes:

step 804: a network device transmits control information including a sidelink grant to a terminal equipment, the control information further indicating at least one piece of destination information to which the sidelink grant is directed.

As shown in FIG. 8, the method may further include:

step 801: the network device receives a scheduling request transmitted by the terminal equipment;

step 802: the network device transmits control information including an uplink grant to the terminal equipment; and step 803: the network device receives a sidelink buffer status report requesting the sidelink grant transmitted by the terminal equipment.

It should be noted that FIG. 8 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8.

In an embodiment, the destination information includes at least one of the following: a destination terminal equipment identifier, a destination terminal equipment group identifier, a link identifier or a connection identifier, a hybrid automatic repeat request entity identifier, a hybrid automatic repeat request process identifier, a source terminal equipment identifier and a destination terminal equipment identifier, a source terminal equipment identifier and a destination terminal equipment group identifier, an identifier calculated according to the destination terminal equipment identifier, an identifier calculated according to the destination terminal equipment group identifier, an identifier calculated according to the source terminal equipment identifier and the destination terminal equipment identifier, and an identifier calculated according to the source terminal equipment identifier and the destination terminal equipment group identifier. Reference may be made to Embodiment 1 for particular contents of the destination information.

In an embodiment, the destination information is contained in the control information.

In an embodiment, the destination information is indicated by a resource where the control information is located. For example, the destination information corresponds to a time starting position and/or a frequency starting position of a search space where the control information is located, and/or the destination information corresponds to a time starting position and/or a frequency starting position of a control resource set (CORESET) where the control information is located.

In an embodiment, the destination information may be indicated by scrambling cyclic redundancy check (CRC) of the control information by using the destination information.

In an embodiment, the destination information is layer 2 information or information on a layer higher than layer 2.

In an embodiment, the destination information is layer 1 information; and the method further includes: transmitting information on a mapping relationship between the layer 1 information and the layer 2 information or the information on a layer higher than layer 2.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that by indicating, by the control information including the sidelink grant, the destination information to which the sidelink grant is directed, the network device is enabled to schedule different resources for different destination terminal equipments, and the transmitting terminal equipment is enabled to know the destination terminal equipment to which the sidelink grant corresponds and perform sidelink transmission by using suitable resources, thereby improving channel utilization or transmission reliability, and meeting requirements on quality of service (QoS) of V2X services.

In addition, the network device and the transmitting terminal device may make an agreement on a correspondence between the resource indicated by the side link grant and the destination terminal equipment, and the destination ID may no longer be carried in an MAC PDU subheader of the sidelink data, or, a length of the destination ID may be reduced, thereby lowering overhead of the MAC PDU and simplifying processing of the MAC PDU by the receiving terminal equipment.

Embodiment 3

The embodiments of this disclosure provide an apparatus for transmitting sidelink data. The apparatus may be a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in Embodiment 1 shall not be described herein any further.

Figure 9:
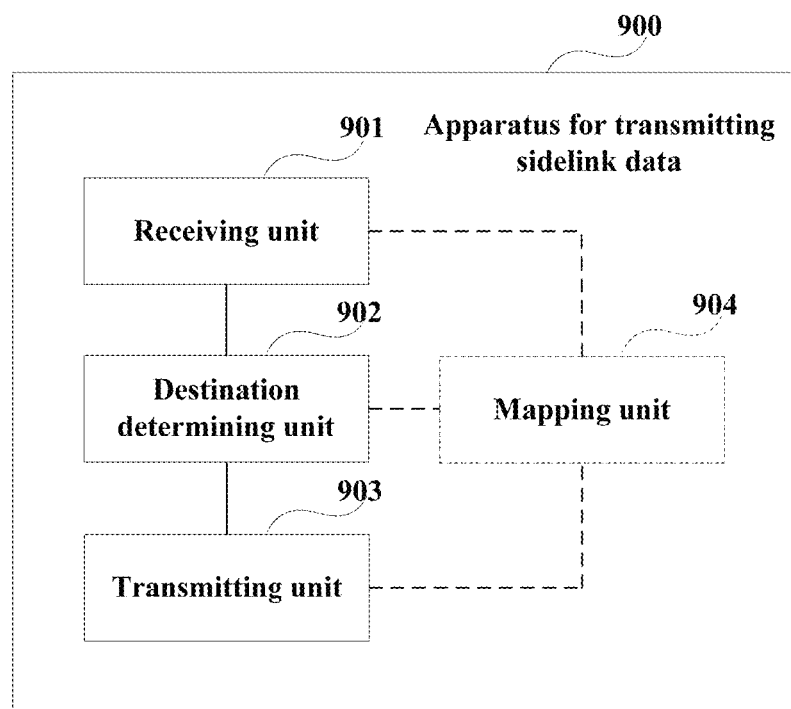
FIG. 9 is a schematic diagram of the apparatus for transmitting sidelink data of an embodiment of this disclosure.

FIG. 9 is a schematic diagram of the apparatus for transmitting sidelink data of the embodiment of this disclosure. As shown in FIG. 9, an apparatus 900 for transmitting sidelink data includes:

a receiving unit 901 configured to receive control information including a sidelink grant and transmitted by a network device, the control information further indicating at least one piece of destination information to which the sidelink grant is directed;

a destination determining unit 902 configured to determine at least one destination and/or logical channel according to the destination information; and a transmitting unit 903 configured to transmit sidelink data of the at least one destination and/or logical channel according to the sidelink grant.

In an embodiment, the destination information includes at least one of the following: a destination terminal equipment identifier, a destination terminal equipment group identifier, a link identifier or a connection identifier, a hybrid automatic repeat request entity identifier, a hybrid automatic repeat request process identifier, a source terminal equipment identifier and a destination terminal equipment identifier, a source terminal equipment identifier and a destination terminal equipment group identifier, an identifier calculated according to the destination terminal equipment identifier, an identifier calculated according to the destination terminal equipment group identifier, an identifier calculated according to the source terminal equipment identifier and the destination terminal equipment identifier, and an identifier calculated according to the source terminal equipment identifier and the destination terminal equipment group identifier. Reference may be made to Embodiment 1 for particular contents of the destination information.

In an embodiment, the destination information is contained in the control information.

In an embodiment, the destination information is indicated by a resource where the control information is located.

In an embodiment, the destination information corresponds to a time starting position and/or a frequency starting position of a search space where the control information is located; and/or, the destination information corresponds to a time starting position and/or a frequency starting position of a control resource set where the control information is located.

In an embodiment, the destination information is indicated by scrambling cyclic redundancy check of the control information by using the destination information.

In an embodiment, the destination information is Layer 2 information or information on a layer higher than the Layer 2.

In an embodiment, the destination information is Layer 1 information.

As shown in FIG. 9, the apparatus 900 for transmitting sidelink data may further include:

a mapping unit 904 configured to map the Layer 1 information into at least one piece of Layer 2 information or information on a layer higher than the Layer 2.

In an embodiment, the receiving unit 901 is further configured to receive a mapping relationship between the Layer 1 information and the Layer 2 information or information on a layer higher than the Layer 2 transmitted by the network device.

In an embodiment, the destination determining unit 902 is configured to select at least one destination having an identifier in consistence with that of the destination information, and determine a logical channel to which the selected at least one destination corresponds.

In an embodiment, the destination determining unit 902 is configured to select at least one logical channel with a corresponding destination identifier in consistence with the destination information.

In an embodiment, the destination determining unit 902 selects at least one logical channel from one or more logical channels having data to be transmitted, and allocates one or more resources indicated by the sidelink grant for the selected at least one logical channel in a descending order of priorities of logical channels.

In an embodiment, the sidelink grant is further associated with at least one of the following: a subcarrier spacing, a physical sidelink shared channel transmission length, carrier information.

In an embodiment, a subcarrier spacing configured for the logical channel includes the subcarrier spacing associated with the sidelink grant; and/or a physical sidelink shared channel transmission length configured for the logical channel is greater than or equal to the physical sidelink shared channel transmission length associated with the sidelink grant; and/or an allowed carrier configured for the logical channel includes the carrier information associated with the sidelink grant.

In an embodiment, the transmitting unit 903 is further configured to transmit a scheduling request to the network device when the sidelink data are needed to be transmitted; the receiving unit 901 is further configured to receive control information including an uplink grant transmitted by the network device; and the transmitting unit 903 is further configured to transmit a sidelink buffer status report to the network device according to the uplink grant to request for the sidelink grant.

In an embodiment, the sidelink buffer status report includes a destination identifier. For example, the destination identifier includes at least one of the following: a destination address to which sidelink data are to be transmitted, a link identifier, a connection identifier, an HARQ entity identifier, an HARQ process identifier, an identifier calculated according to a destination terminal equipment identifier, an identifier calculated according to a destination terminal equipment group identifier, an identifier calculated according to a source terminal equipment identifier and a destination terminal equipment identifier, an identifier calculated according to a source terminal equipment identifier and a destination terminal equipment group identifier.

It should be noted that the components or modules related to this disclosure are only described above. However, this disclosure is not limited thereto, and the apparatus 900 for transmitting sidelink data may further include other components or modules, and reference may be made to related techniques for particulars of these components or modules.

Furthermore, for the sake of simplicity, connection relationships between the components or modules or signal profiles thereof are only illustrated in FIG. 9. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that by indicating, by the control information including the sidelink grant, the destination information to which the sidelink grant is directed, the network device is enabled to schedule different resources for different destination terminal equipments, and the transmitting terminal equipment is enabled to know the destination terminal equipment to which the sidelink grant corresponds and perform sidelink transmission by using suitable resources, thereby improving channel utilization or transmission reliability, and meeting requirements on quality of service (QoS) of V2X services.

In addition, the network device and the transmitting terminal device may make an agreement on a correspondence between the resource indicated by the side link grant and the destination terminal equipment, and the destination ID may no longer be carried in an MAC PDU subheader of the sidelink data, or, a length of the destination ID may be reduced, thereby lowering overhead of the MAC PDU and simplifying processing of the MAC PDU by the receiving terminal equipment.

Embodiment 4

The embodiments of this disclosure provide an apparatus for configuring sidelink data. The apparatus may be a network device, or may be one or more components or assemblies configured in a network device; however, this disclosure is not limited thereto; for example, it may also be a roadside device, or may be one or more components or assemblies configured in a roadside device. Contents in the embodiments identical to those in Embodiment 4 shall not be described herein any further.

Figure 10:
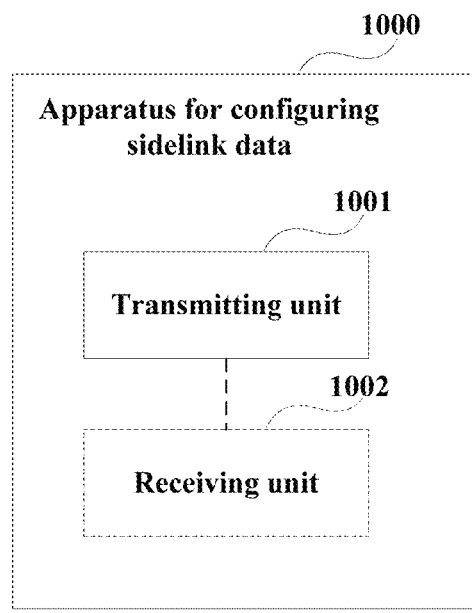
FIG. 10 is a schematic diagram of the apparatus for configuring sidelink data of an embodiment of this disclosure.

FIG. 10 is a schematic diagram of the apparatus for configuring sidelink data of the embodiment of this disclosure. As shown in FIG. 10, an apparatus 1000 for configuring sidelink data includes:

a transmitting unit 1001 configured to transmit control information including a sidelink grant to a terminal equipment, the control information further indicating at least one piece of destination information to which the sidelink grant is directed.

As shown in FIG. 10, the apparatus 1000 for configuring sidelink data may further include:

a receiving unit 1002 configured to receive a scheduling request transmitted by the terminal equipment;

and the transmitting unit 1001 is further configured to transmit control information including an uplink grant to the terminal equipment; and the receiving unit 1002 is further configured to receive a sidelink buffer status report requesting the sidelink grant transmitted by the terminal equipment.

In an embodiment, the destination information includes at least one of the following: a destination terminal equipment identifier, a destination terminal equipment group identifier, a link identifier or a connection identifier, a hybrid automatic repeat request entity identifier, a hybrid automatic repeat request process identifier, a source terminal equipment identifier and a destination terminal equipment identifier, a source terminal equipment identifier and a destination terminal equipment group identifier, an identifier calculated according to the destination terminal equipment identifier, an identifier calculated according to the destination terminal equipment group identifier, an identifier calculated according to the source terminal equipment identifier and the destination terminal equipment identifier, an identifier calculated according to the source terminal equipment identifier and the destination terminal equipment group identifier. Reference may be made to Embodiment 1 for particular contents of the destination information.

It should be noted that the components or modules related to this disclosure are only described above. However, this disclosure is not limited thereto, and the apparatus 1000 for configuring sidelink data may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that by indicating, by the control information including the sidelink grant, the destination information to which the sidelink grant is directed, the network device is enabled to schedule different resources for different destination terminal equipments, and the transmitting terminal equipment is enabled to know the destination terminal equipment to which the sidelink grant corresponds and perform sidelink transmission by using suitable resources, thereby improving channel utilization or transmission reliability, and meeting requirements on quality of service (QoS) of V2X services.

In addition, the network device and the transmitting terminal device may make an agreement on a correspondence between the resource indicated by the side link grant and the destination terminal equipment, and the destination ID may no longer be carried in an MAC PDU subheader of the sidelink data, or, a length of the destination ID may be reduced, thereby lowering overhead of the MAC PDU and simplifying processing of the MAC PDU by the receiving terminal equipment.

Embodiment 5

The embodiments of this disclosure provide a communication system, and reference may be made to FIG. 1, with contents identical to those in embodiments 1-4 being not going to be described herein any further. In an embodiment, the communication system 100 may include:

a network device 101 configured to transmit control information including a sidelink grant to a first terminal equipment 102, the control information further indicating at least one piece of destination information to which the sidelink grant is directed;

the first terminal equipment 102 configured to determine at least one destination and/or logical channel according to the destination information, and transmit sidelink data of the at least one destination and/or logical channel according to the sidelink grant; and a second terminal equipment 103 configured to receive the sidelink data transmitted by the first terminal equipment 102.

The embodiment of this disclosure further provides a network device, which may be, for example, a base station. However, this disclosure is not limited thereto, and it may also be another network device.

Figure 11:
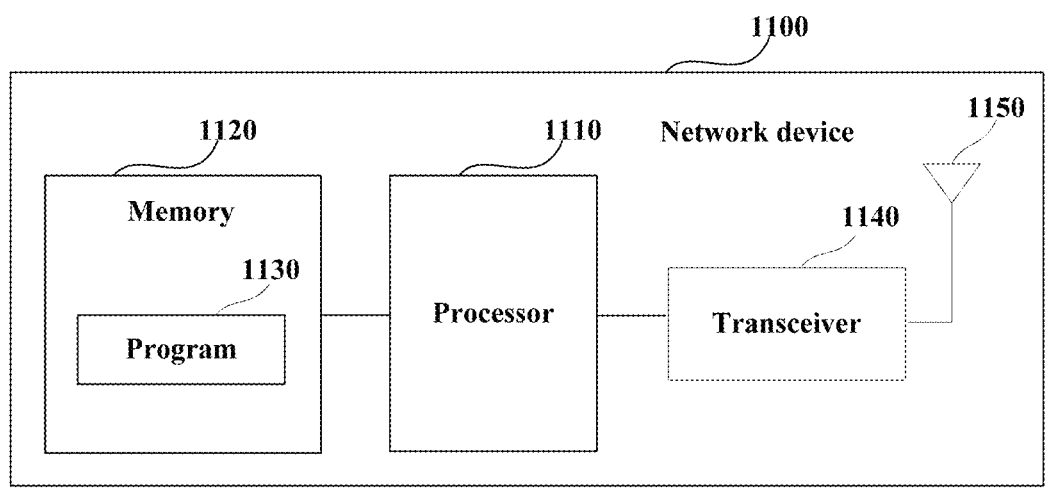
FIG. 11 is a schematic diagram of the network device of an embodiment of this disclosure.

FIG. 11 is a schematic diagram of a structure of the network device of the embodiment of this disclosure. As shown in FIG. 11, the network device 1100 may include a processor 1110 (such as a central processing unit (CPU)) and a memory 1120, the memory 1120 being coupled to the processor 1110. The memory 1120 may store various data, and furthermore, it may store a program 1130 for data processing, and execute the program 1130 under control of the processor 1110.

For example, the processor 1110 may be configured to execute the program to carry out the method for configuring sidelink data as described in Embodiment 2. For example, the processor 1110 may be configured to perform the following control: transmitting control information including a sidelink grant to a terminal equipment, the control information further indicating at least one piece of destination information to which the sidelink grant is directed.

Furthermore, as shown in FIG. 11, the network device 1100 may include a transceiver 1140, and an antenna 1150, etc. Functions of the above components are similar to those in the relevant art, and shall not be described herein any further. It should be noted that the network device 1100 does not necessarily include all the parts shown in FIG. 11, and furthermore, the network device 1100 may include parts not shown in FIG. 11, and the relevant art may be referred to.

The embodiment of this disclosure further provides a terminal equipment, however, this disclosure is not limited thereto, and it may also be another equipment.

Figure 12:
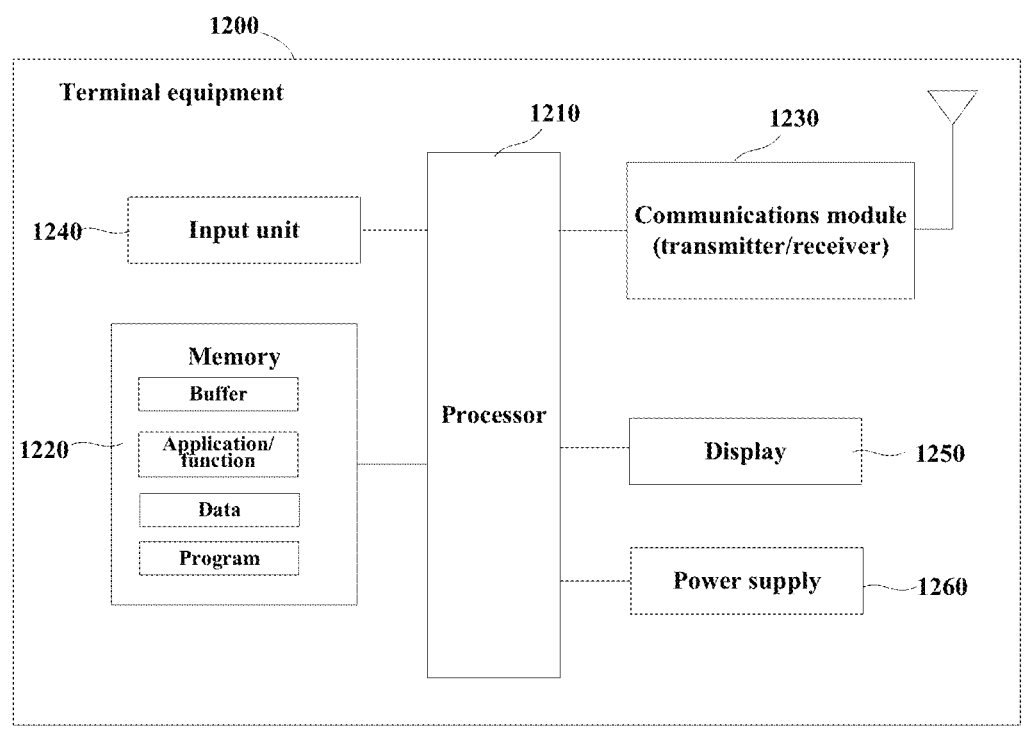
FIG. 12 is a schematic diagram of the terminal equipment of an embodiment of this disclosure.

FIG. 12 is a schematic diagram of the terminal equipment of the embodiment of this disclosure. As shown in FIG. 12, a terminal equipment 1200 may include a processor 1210 and a memory 1220, the memory 1220 storing data and a program and being coupled to the processor 1210. It should be noted that his figure is illustrative only, and other types of structures may also be used, so as to supplement or replace this structure and achieve a telecommunications function or other functions.

For example, the processor 1210 may be configured to execute a program to carry out the method for transmitting sidelink data as described in Embodiment 1. For example, the processor 1210 may be configured to perform the following control: receiving control information including a sidelink grant and transmitted by a network device, the control information further indicating at least one piece of destination information to which the sidelink grant is directed; determining at least one destination and/or logical channel according to the destination information; and transmitting sidelink data of the at least one destination and/or logical channel according to the sidelink grant.

As shown in FIG. 12, the terminal equipment 1200 may further include a communication module 1230, an input unit 1240, a display 1250, and a power supply 1260; functions of the above components are similar to those in the relevant art, which shall not be described herein any further. It should be noted that the terminal equipment 1200 does not necessarily include all the parts shown in FIG. 12, and the above components are not necessary. Furthermore, the terminal equipment 1200 may include parts not shown in FIG. 12, and the relevant art may be referred to.

An embodiment of the present disclosure provides a computer program, which, when executed in a terminal equipment, will cause the terminal equipment to carry out the method for transmitting sidelink data as described in Embodiment 1.

An embodiment of this disclosure provides a storage medium, including a computer program, which will cause a terminal equipment to carry out the method for transmitting sidelink data as described in Embodiment 1.

An embodiment of the present disclosure provides a computer program, which, when executed in a network device, will cause the network device to carry out the method for configuring sidelink data as described in Embodiment 2.

An embodiment of this disclosure provides a storage medium, including a computer program, which will cause a network device to carry out the method for configuring sidelink data as described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for transmitting sidelink data, including:

receiving, by a terminal equipment, control information including a sidelink grant (SL grant) and transmitted by a network device, the control information further indicating at least one piece of destination information to which the sidelink grant is directed;

determining at least one destination and/or logical channel according to the destination information; and transmitting sidelink data of the at least one destination and/or logical channel according to the sidelink grant.

Supplement 2. The method according to supplement 1, wherein the destination information includes at least one of the following: a destination terminal equipment identifier, a destination terminal equipment group identifier, a link identifier or a connection identifier, a hybrid automatic repeat request entity identifier, a hybrid automatic repeat request process identifier, a source terminal equipment identifier and a destination terminal equipment identifier, a source terminal equipment identifier and a destination terminal equipment group identifier, an identifier calculated according to the destination terminal equipment identifier, an identifier calculated according to the destination terminal equipment group identifier, an identifier calculated according to the source terminal equipment identifier and the destination terminal equipment identifier, and an identifier calculated according to the source terminal equipment identifier and the destination terminal equipment group identifier.

Supplement 3. The method according to supplement 2, wherein the destination information includes one of the following: a destination ID of a destination terminal equipment provided by a V2X application layer, a destination address or identifier of a destination terminal equipment configured by a core network, and a destination address or identifier of a destination terminal equipment configured by a network device;

or, the destination terminal equipment identifier is a part of a provided destination ID or configured destination address or identifier.

Supplement 4. The method according to supplement 2, wherein the destination information includes one of the following: a destination group ID of a destination terminal equipment provided by a V2X application layer, a destination group address or identifier of a destination terminal equipment group configured by a core network, and a destination group address or identifier of a destination terminal equipment group configured by a network device;

or, the destination terminal equipment identifier is a part of a provided destination group ID or configured destination group address or identifier.

Supplement 5. The method according to supplement 2, wherein the link identifier or connection identifier includes a link identifier or connection identifier of a transmitting terminal equipment for different destination terminal equipments and/or for different destination terminal equipment groups and/or for a broadcast sidelink.

Supplement 6. The method according to supplement 2, wherein the hybrid automatic repeat request (HARQ) entity identifier includes an HARQ entity identifier in the transmitting terminal equipment, and the hybrid automatic repeat request (HARQ) process identifier includes an HARQ process identifier in the transmitting terminal equipment.

Supplement 7. The method according to supplement 2, wherein the source terminal equipment identifier and destination terminal equipment (group) identifier include at least one of the following: a source identifier destination identifier provided by a V2X application layer, a source terminal equipment address or identifier and a destination terminal equipment (group) address or identifier configured by a core network, and a source terminal equipment address or identifier and a destination terminal equipment (group) address or identifier configured by a network device;

or, the source terminal equipment identifier and destination terminal equipment (group) identifier include a part of bits to which the provided source identifier and a destination (group) identifier or the configured address or identifier correspond.

Supplement 8. The method according to supplement 2, wherein the identifier calculated according to the destination terminal equipment (group) identifier includes: an identifier calculated by using a specific function (such as a hash function) according to the C-RNTI or destination ID of the destination terminal equipment (group);

and the identifier calculated according to the source terminal equipment identifier and the destination terminal equipment (group) identifier includes: an identifier calculated by using the specific function (such as a hash function) according to an SL-RNTI or a C-RNTI or a source ID of the source terminal equipment and a C-RNTI or a destination ID of the destination terminal equipment (group).

Supplement 9. The method according to any one of supplements 1-8, wherein the destination information is contained in the control information.

Supplement 10. The method according to any one of supplements 1-8, wherein the destination information is indicated by a resource where the control information is located.

Supplement 11. The method according to supplement 10, wherein the destination information corresponds to a time starting position and/or a frequency starting position of a search space where the control information is located; and/or the destination information corresponds to a time starting position and/or a frequency starting position of a control resource set where the control information is located.

Supplement 12. The method according to any one of supplements 1-8, wherein the destination information is indicated by scrambling cyclic redundancy check of the control information by using the destination information.

Supplement 13. The method according to any one of supplements 1-12, wherein the destination information is Layer 2 information or information on a layer higher than the Layer 2 (a higher layer).

Supplement 14. The method according to any one of supplements 1-12, wherein the destination information is Layer 1 information, and the method further includes:

mapping the Layer 1 information into at least one piece of Layer 2 information or information on a layer higher than the Layer 2 (higher layer information).

Supplement 15. The method according to supplement 14, wherein the method further includes:

receiving a mapping relationship between the Layer 1 information and the Layer 2 information or information on a layer higher than the Layer 2 transmitted by the network device.

Supplement 16. The method according to any one of supplements 1-15, wherein the destination information is a link identifier or a connection identifier;

and the terminal equipment selects a link or destination address related to the link identifier or connection identifier indicated by the control information and a logical channel; or the terminal equipment selects a logical channel related to the link identifier or connection identifier indicated by the control information.

Supplement 17. The method according to any one of supplements 1-15, wherein the destination information is a hybrid automatic repeat request (HARQ) entity ID and/or a hybrid automatic repeat request (HARQ) process ID;

and the terminal equipment transmits initial or retransmission data of an HARQ process of an HARQ entity with an identifier in accordance with the HARQ entity ID and/or the HARQ process ID in the resource indicated by the sidelink grant according to the HARQ entity ID and/or the HARQ process ID.

Supplement 18. The method according to any one of supplements 1-17, wherein the determining at least one destination and/or logical channel according to the destination information includes:

selecting at least one destination having an identifier in consistence with that of the destination information; and determining a logical channel to which the selected at least one destination corresponds.

Supplement 19. The method according to any one of supplements 1-17, wherein the determining at least one destination and/or logical channel according to the destination information includes:

selecting at least one logical channel with an identifier in consistence with the destination information (such as identical IDs).

Supplement 20. The method according to any one of supplements 1-17, wherein the determining at least one destination and/or logical channel according to the destination information includes:

selecting at least one logical channel with a corresponding destination ID in consistence with the destination information (such as identical IDs).

Supplement 21. The method according to any one of supplements 1-20, wherein at least one logical channel is selected from logical channels having data to be transmitted, and the method further includes:

allocating resources indicated by the sidelink grant for the selected at least one logical channel in a descending order of priorities of logical channels.

Supplement 22. The method according to any one of supplements 1-21, wherein the sidelink grant is further associated with (or corresponds to) at least one of the following: a subcarrier spacing, a physical sidelink shared channel (PSSCH) transmission length, and carrier information.

Supplement 23. The method according to any one of supplements 18-22, wherein a subcarrier spacing configured for the logical channel includes the subcarrier spacing associated with the sidelink grant; and/or a PSSCH transmission length configured for the logical channel is greater than or equal to the PSSCH transmission length associated with the sidelink grant; and/or an allowed carrier configured for the logical channel includes the carrier information associated with the sidelink grant.

Supplement 24. The method according to any one of supplements 1-23, wherein the method further includes:

transmitting a scheduling request by the terminal equipment to the network device when the sidelink data are needed to be transmitted;

receiving control information including an uplink grant transmitted by the network device; and transmitting a sidelink buffer status report to the network device according to the uplink grant to request for the sidelink grant.

Supplement 25. The method according to supplement 24, wherein the scheduling request corresponds to at least one sidelink logical channel.

Supplement 26. The method according to supplement 25, wherein a correspondence between configuration of the scheduling request and the at least one sidelink logical channel is preset by the network device, or the correspondence is predefined.

Supplement 27. The method according to any one of supplements 24-26, wherein the sidelink buffer status report at least includes a link identifier.

Supplement 28. The method according to supplement 27, wherein the destination identifier includes at least one of the following: a destination address to which sidelink data are to be transmitted, a link identifier, a connection identifier, an HARQ entity identifier, an HARQ process identifier, an identifier calculated according to a destination terminal equipment identifier, an identifier calculated according to a destination terminal equipment group identifier, an identifier calculated according to a source terminal equipment identifier and a destination terminal equipment identifier, an identifier calculated according to a source terminal equipment identifier and a destination terminal equipment group identifier.

Supplement 29. The method according supplement 27 or 28, wherein the sidelink buffer status report further includes a logical channel group identifier and/or a buffer size.

Supplement 30. A method for requesting sidelink data, including:

transmitting a scheduling request by a terminal equipment to a network device when sidelink data are needed to be transmitted;

wherein, the scheduling request corresponds to at least one sidelink logical channel.

Supplement 31. The method according supplement 30, wherein a correspondence between configuration of the scheduling request and the at least one sidelink logical channel is preconfigured by the network device, or is predefined.

Supplement 32. A method for requesting sidelink data, including:

receiving, by a terminal equipment, control information including an uplink grant transmitted by a network device; and transmitting a sidelink buffer status report to the network device according to the uplink grant to request for the sidelink grant, the sidelink buffer status report at least including a destination identifier.

Supplement 33. The method according supplement 32, wherein the destination identifier includes at least one of the following: a destination address to which sidelink data are to be transmitted, a link identifier, a connection identifier, an HARQ entity identifier, an HARQ process identifier, an identifier calculated according to a destination terminal equipment identifier, an identifier calculated according to a destination terminal equipment group identifier, an identifier calculated according to a source terminal equipment identifier and a destination terminal equipment identifier, an identifier calculated according to a source terminal equipment identifier and a destination terminal equipment group identifier.

Supplement 34. The method according supplement 32 or 33, wherein the sidelink buffer status report further includes a logical channel group identifier and/or a buffer size.

Supplement 35. A method for configuring sidelink data, including:

transmitting control information including a sidelink (SL) grant by a network device to a terminal equipment, the control information further indicating at least one piece of destination information to which the sidelink grant is directed.

Supplement 36. The method according supplement 35, wherein the method further includes:

receiving by the network device a scheduling request transmitted by the terminal equipment;

transmitting control information including an uplink grant to the terminal equipment; and receiving a sidelink buffer status report requesting the sidelink grant transmitted by the terminal equipment.

Supplement 37. The method according supplement 35 or 36, wherein the destination information includes at least one of the following: a destination terminal equipment identifier, a destination terminal equipment group identifier, a link identifier or a connection identifier, a hybrid automatic repeat request entity identifier, a hybrid automatic repeat request process identifier, a source terminal equipment identifier and a destination terminal equipment identifier, a source terminal equipment identifier and a destination terminal equipment group identifier, an identifier calculated according to the destination terminal equipment identifier, an identifier calculated according to the destination terminal equipment group identifier, an identifier calculated according to the source terminal equipment identifier and the destination terminal equipment identifier, an identifier calculated according to the source terminal equipment identifier and the destination terminal equipment group identifier.

Supplement 38. The method according to any one of supplements 35-37, wherein the destination information is contained in the control information.

Supplement 39. The method according to any one of supplements 35-37, wherein the destination information is indicated by a resource where the control information is located.

Supplement 40. The method according to supplement 39, wherein the destination information corresponds to a time starting position and/or a frequency starting position of a search space where the control information is located; and/or the destination information corresponds to a time starting position and/or a frequency starting position of a control resource set where the control information is located.

Supplement 41. The method according to any one of supplements 35-37, wherein the destination information is indicated by scrambling cyclic redundancy check (CRC) of the control information by using the destination information.

Supplement 42. The method according to any one of supplements 35-41, wherein the destination information is Layer 2 information or information on a layer higher than the Layer 2.

Supplement 43. The method according to any one of supplements 35-41, wherein the destination information is Layer 1 information, and the method further includes:

transmitting information on a mapping relationship between the Layer 1 information and the Layer 2 information or information on a layer higher than the Layer 2 of the destination information.

Supplement 44. A terminal equipment, including a memory and a processor, the memory storing a computer program, and the processor being configured to execute the computer program to carry out the method for transmitting sidelink data as described in any one of supplements 1-29 or the method for requesting sidelink data as described in any one of supplements 30-34.

Supplement 45. A network device, including a memory and a processor, the memory storing a computer program, and the processor being configured to execute the computer program to carry out the method for configuring sidelink data as described in any one of supplements 35-43.

What is claimed is:

1. An apparatus for transmitting sidelink data, comprising:
a memory that stores a plurality of instructions; and
a processor coupled to the memory and configured to execute the instructions to:
receive downlink control information comprising a sidelink grant and transmitted by a network device, the downlink control information further indicating at least one piece of destination information to which the sidelink grant is directed, wherein the destination information comprises a hybrid automatic repeat request process identifier; and
transmit initial or retransmission data of a sidelink hybrid automatic repeat request process with an identifier corresponding to the hybrid automatic repeat request process identifier in a sidelink resource indicated by the sidelink grant.

2. The apparatus according to claim 1, wherein the destination information is contained in the downlink control information.

3. The apparatus according to claim 1, wherein the destination information is indicated by a resource where the downlink control information is located.

4. The apparatus according to claim 1, wherein the destination information is indicated by scrambling cyclic redundancy check of the downlink control information by using the destination information.

5. The apparatus according to claim 1, wherein the destination information is Layer 2 information or information on a layer higher than the Layer 2.

6. The apparatus according to claim 1, wherein the destination information is Layer 1 information, and the processor is further configured to map the Layer 1 information into at least one piece of Layer 2 information or information on a layer higher than the Layer 2.

7. The apparatus according to claim 1, wherein the processor is configured to select at least one destination having an identifier in consistence with that of the destination information, and determine a logical channel to which the selected at least one destination corresponds.

8. The apparatus according to claim 1, wherein the processor is configured to select at least one logical channel with a corresponding destination identifier in consistence with the destination information.

9. The apparatus according to claim 1, wherein the processor is configured to select at least one logical channel from one or more logical channels having data to be transmitted, and allocate one or more resources indicated by the sidelink grant for the selected at least one logical channel in a descending order of priorities of logical channels.

10. The apparatus according to claim 1, wherein the sidelink grant is further associated with at least one of the following: a subcarrier spacing, a physical sidelink shared channel transmission length, or carrier information.

11. The apparatus according to claim 10, wherein a subcarrier spacing configured for a logical channel comprises the subcarrier spacing associated with the sidelink grant; and/or
- a physical sidelink shared channel transmission length configured for the logical channel is greater than or equal to the physical sidelink shared channel transmission length associated with the sidelink grant; and/or
- an allowed carrier configured for the logical channel comprises the carrier information associated with the sidelink grant.

12. The apparatus according to claim 1, wherein the processor is further configured to transmit a scheduling request to the network device when the sidelink data are needed to be transmitted; receive control information comprising an uplink grant transmitted by the network device; and transmit a sidelink buffer status report to the network device according to the uplink grant to request for the sidelink grant.

13. The apparatus according to claim 12, wherein the sidelink buffer status report comprises at least one link identifier.

14. An apparatus for configuring sidelink data, comprising:
- a memory that stores a plurality of instructions; and
- a processor coupled to the memory and configured to execute the instructions to:
transmit downlink control information comprising a sidelink grant to a terminal equipment, the downlink control information further indicating at least one piece of destination information to which the sidelink grant is directed, wherein the destination information comprises a hybrid automatic repeat request process identifier, the hybrid automatic repeat request process identifier being used by the terminal equipment to transmit initial or retransmission data of a sidelink hybrid automatic repeat request process with an identifier corresponding to the hybrid automatic repeat request process identifier in a sidelink resource indicated by the sidelink grant.

15. The apparatus according to claim 14, wherein the processor is further configured to receive a scheduling request transmitted by the terminal equipment;
transmit control information comprising an uplink grant to the terminal equipment; and
receive a sidelink buffer status report requesting the sidelink grant transmitted by the terminal equipment.

16. A method for requesting sidelink resource, comprising:
transmitting a scheduling request by a terminal equipment to a network device when sidelink data are needed to be transmitted, wherein the scheduling request corresponds to at least one sidelink logical channel; and
receiving a radio resource control reconfiguration message by the terminal equipment, the radio resource control reconfiguration message comprising sidelink related information which comprises logical channel(s) and radio bearer(s).

17. The method according to claim 16, wherein a correspondence between configuration of the scheduling request and the at least one sidelink logical channel is preconfigured by the network device, or is predefined.

18. The method according to claim 16, wherein the method further comprises:
transmitting a radio resource control message by the terminal equipment, the radio resource control message comprising sidelink UE information which comprises quality of service (QoS) characteristics of interested V2X service(s).

* * * * *